Patented Aug. 19, 1924.

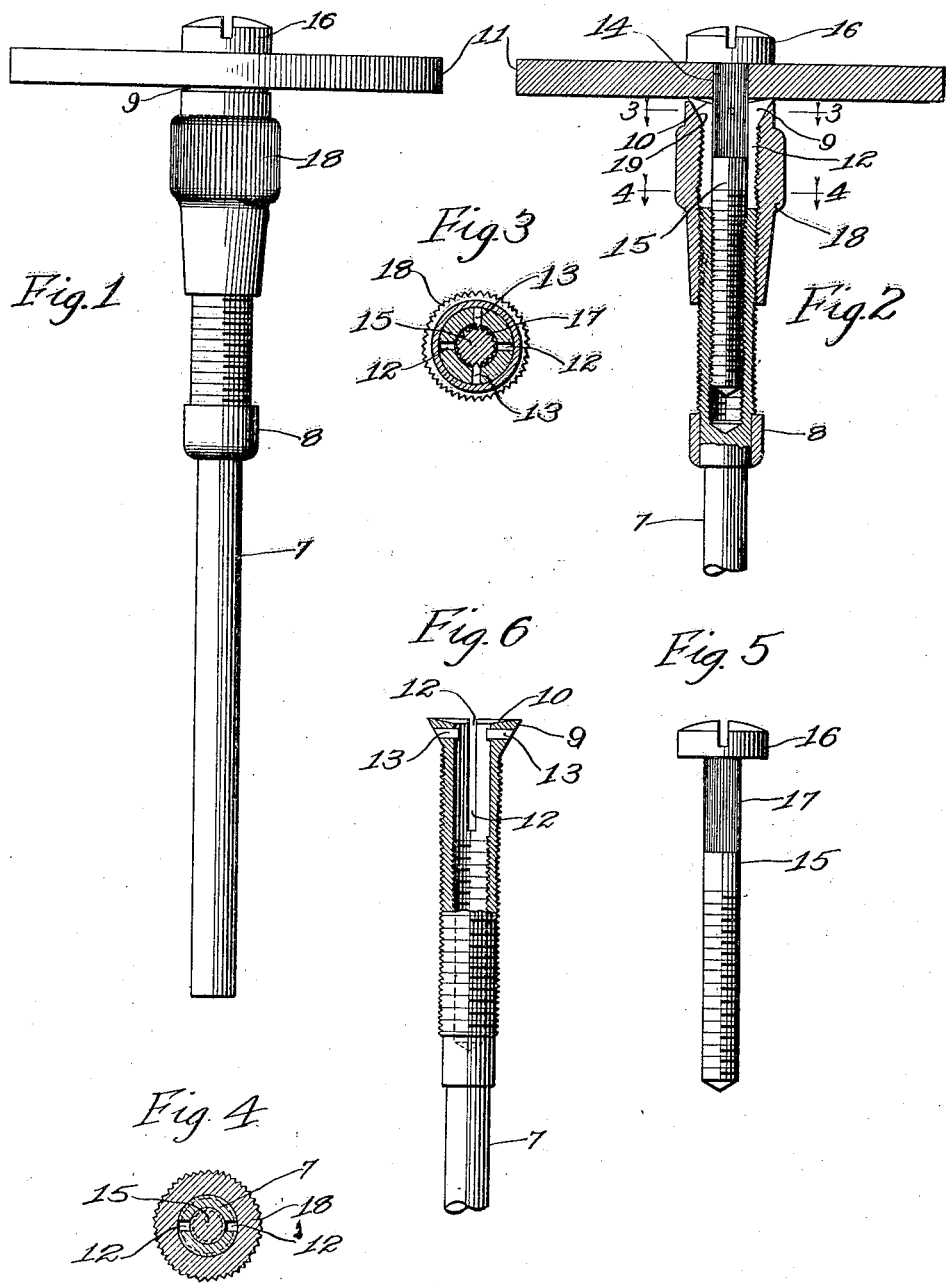

1,505,309

UNITED STATES PATENT OFFICE.

IRA A. BURNETT, OF CHICAGO, ILLINOIS.

DENTAL MANDREL.

Application filed November 10, 1923. Serial No. 673,888.

*To all whom it may concern:*

Be it known that I, IRA A. BURNETT, a citizen of the United States, and a resident of Chicago, county of Cook, and State of Illinois, have invented certain new and useful Improvements in Dental Mandrels, of which the following is a specification.

This invention relates to certain improvements in that class of dental tools or devices in which disks of various kinds of material used for grinding, cutting, polishing, etc., are detachably secured to shanks or mandrels adapted to be carried by a dental-engine hand-piece and driven by a flexible shaft connected with a dental-engine.

The main object of the invention is the provision of a tool or mandrel of the above mentioned general character, which will positively hold disks of various kinds of material used by dentists, in such a manner as to prevent them becoming loose on the mandrel and ineffective upon the reverse movement of the engine hand-piece, thereby overcoming this annoying difficulty, which all dentists have experienced, and furnishing a mandrel adapted for rotation in either direction without the disk carried thereby becoming loose.

Other objects and advantages of the invention will be disclosed in the following description and explanation, which will be more readily understood when read in conjunction with the accompanying drawing, which illustrates an embodiment of which the invention is susceptible, it being understood that other arrangements and modifications may be resorted to without departing from the spirit of the invention, so long as they come within the scope of the appended claims forming a part hereof.

In the accompanying drawing,—

Fig. 1 is a greatly enlarged view in side elevation, of the tool or mandrel, showing a disk held thereby and the parts of the device in their operative positions.

Fig. 2 is a central vertical sectional view of the upper portion of Fig. 1.

Fig. 3 is a plan sectional view taken on line 3—3 of Fig. 2.

Fig. 4 is a similar view taken on line 4—4 of Fig. 2 looking in the direction indicated by the arrows.

Fig. 5 is a detached view in elevation of the detachable clamping member of the device.

Fig. 6 is a view partly in section and partly in elevation of the upper portion of the shank of the mandrel.

Like numerals of reference refer to corresponding parts throughout the different views of the drawing.

The reference numeral 7 designates the shank of the mandrel, which may be made of any suitable size and material and has a longitudinally extended bore in its upper portion, the lower part of which bore or opening is internally screw-threaded, as is clearly shown in Figs. 2 and 6 of the drawing. The upper portion of the shank 7 is provided with screw-threads on its outer surface, which extend downwardly thereon to any suitable distance, yet preferably to about the longitudinal middle of the shank, at which point the latter is provided with a collar 8 which is closely fitted to the shank but removable therefrom and is employed to act as a stop member for the controlling nut or member of the device, as will be presently explained.

The shank 7 is provided at its upper end with an outwardly and upwardly tapered enlargement 9 the upper surface of which is by preference inwardly inclined from its periphery as at 10, see Figs. 2 and 6, for the purpose of providing a rim to rest against the lower surface of the disk 11 to be held by the tool or mandrel. The outer surface of the enlargement 9 is smooth or without screw-threads, as shown in the last named figures of the drawing. The upper end of the shank 7 is provided with a pair of slots 12 which are located diametrically opposite each other and extend from and through the upper end of the enlargement 9 downwardly to a suitable distance, said slots being employed for weakening the upper portion of the shank so as to afford to said portion a degree of resiliency in order that the parts on each side of the slots 12 may be pressed towards each other under certain conditions. It will be observed in Fig. 6 that the bore in the shank 7 is smooth or without screw-threads from its upper end to a point just below the lower ends of the slots therein.

Located diametrically opposite each other on each side of the slots 12 in the enlarged portion 9 of the shank are a pair of projections 13 which in the present instance are shown as pins located in transverse openings in the enlargement 9 and as having their inner ends extended slightly inwardly of the walls of the bore in the shank.

However, these projections may be of other construction or otherwise secured to the enlarged portion 9 but so as to extend a slight distance into its opening to perform the function to be presently explained.

The enlargement 9 constitutes the lower and fixed clamping jaw or member of the device and is adapted to rest or press against the lower surface of the disk 11 concentrically around the central opening 14 therein with which each of the disks is provided.

Extended through the opening 14 of the disk into the bore of the shank is a stem 15 extended centrally from the inner or lower face of the other or detachable clamping member 16 of the device. The stem 15 is provided with screw-threads on its lower portion to engage the internal threads of the shank 7, but it will be seen and understood by reference to Figs. 2 and 5, that the threads on the stem 15 terminate at their upper ends a considerable distance below the clamping member 16 on said stem, and that just below the member 16 the stem 15 is provided with longitudinally extended ribs 17 spaced in parallelism so as to provide a longitudinally extended groove between each pair of said ribs, into which the inwardly extended portions of the projections 13 will fit in such a way as to slightly engage said ribs but not so as to prevent the stem 15 being screwed down into the bore of the shank until the clamping member 16 rests on the upper or outer surface of the disk 11 with sufficient pressure to hold the disk against rotation on the stem 15 between the detachable and fixed clamping members.

Mounted on the externally screw-threaded portion of the shank 7 in screw engagement therewith, is a controlling nut or member 18 which is by preference milled on its outer surface and of the shape shown in Fig. 1 of the drawing. The upper end of the screw-threaded opening in the member 18 is outwardly flared as at 19 and is of a size to fit around the upwardly tapered enlargement or fixed clamping member 9 when the member or nut 18 is advanced on the screw-threaded portion of the shank sufficiently for said purpose, when by causing the nut 18 to be advanced further towards the disk 11, it is evident that the divided upper portions of the shank as well as the divided portions of the enlargement 9, will be forced slightly towards each other, thus causing the projections 13 carried by the clamping member or part 9 to engage the ribs 17 so as to prevent rotation of the stem 15 in either direction, no matter which way the mandrel may be rotated.

From the foregoing and by reference to the drawing, it will be readily understood and clearly seen that, assuming it is desired to place a disk 11 in operative position on the mandrel, and assuming that the detachable clamping member 16 has been removed from the position shown in Figs. 1 and 2 and that the controlling nut or member 18 has been retracted on the shank sufficiently to release the inclined or flared walls 19 of the upper end of the opening in said member from contact with the outwardly flared clamping member 9, it is manifest that a disk 11 having a central opening 14 therein, can be placed on the stem 15 of the clamping member 16 when said stem can be inserted into the screw-threaded opening of the shank and caused to assume about the position shown in Figs. 1 and 2 by turning the clamping member 16 in the proper direction.

Now, by advancing the controlling nut 18 on the shank, it is obvious that the contact of its upper end with the flared clamping member 9 will cause the projections 13 to engage the ribbed surface of the stem 15, thus causing the disk 11 to be securely clamped between the last named clamping member and the detachable member and in such a way that loosening of the disk will be prevented.

While I have shown the upper portion of the shank 7 provided with a pair of slots, yet it is obvious that one or more slots can be employed to furnish resiliency to the upper portion of the shank or weakening thereof so that its upper portion may be slightly compressed by the upward movement of the controlling nut. Instead of employing a pair of projections 13, a single projection may be employed or more than two, and it is also obvious that instead of locating the projection or projections in the enlarged portion 9 of the shank, it or they may be located at any suitable point on its upper portion.

The lower or unthreaded portion of the shaft 7 is adapted to fit in a suitable socket in an engine hand-piece and to be held therein by a suitable chuck with which such hand-pieces are provided. The disk may be mounted on the mandrel before or after it has been connected to the hand-piece, as is obvious.

It will be understood that the external screw-threads on the shank 7 are left-hand ones, while those on the stem 15 are of the right-hand type.

Having thus fully described my invention, what I claim as new and desire to secure by Letters Patent is:

1. A dental mandrel comprising a shank having one of its ends slotted and provided with a longitudinally extended bore having screw-threads, said end of the shank being provided with a slotted clamping member and carrying inwardly extended engaging means, said clamping member having its outer surface flared, screw-threads on the shank below said member, another clamping member having a stem provided on its lower portion with screw-threads to engage the threads of said bore and above said threads with engaging means to co-act with the first named engaging means and adapted to cooperate with the first named clamping member to clamp a disk between them, and a controlling nut mounted on the screw-threaded portion of the shank and co-operating with the first named clamping member to cause said stem to be locked against independent rotary movement.

2. A dental mandrel comprising a shank having one of its ends slotted and provided with a longitudinally extended bore having screw-threads therein below its slotted portion, said end of the shank being provided with a slotted clamping member and carrying at least one inwardly extended projection, said clamping member having its outer surface flared, screw-threads on the shank below said member, another clamping member having a stem provided on its lower portion with screw-threads to engage the threads of said bore and above said threads with spaced means to co-act with the first named engaging means and adapted to cooperate with the first named clamping member to clamp a disk between them, and a controlling nut mounted on the screw-threaded portion of the shank and co-operating with the first named clamping member to cause said stem to be locked against independent rotary movement.

3. A dental mandrel comprising a shank having one of its ends slotted and provided with a longitudinally extended bore having screw-threads below the slotted portion of the shank only, said end of the shank being provided with a slotted clamping member for a disk, at least one inwardly extended projection carried by said member, said clamping member having its outer surface flared, screw-threads on the shank below said member, another clamping member having a stem provided on its lower portion with screw-threads to engage the threads of said bore and above said threads with longitudinally disposed spaced ribs to co-act with the said inwardly extended projection and adapted to co-operate with the first named clamping member to clamp a disk between them, and a controlling nut mounted on the screw-threaded portion of the shank and having the upper end of its opening flared for co-operation with the first named clamping member to cause said stem to be locked against independent rotary movement.

IRA A. BURNETT.